A. HARTL.
CHUTE CART OR WAGON.
APPLICATION FILED APR. 28, 1908.
926,983.
Patented July 6, 1909.
2 SHEETS—SHEET 1.
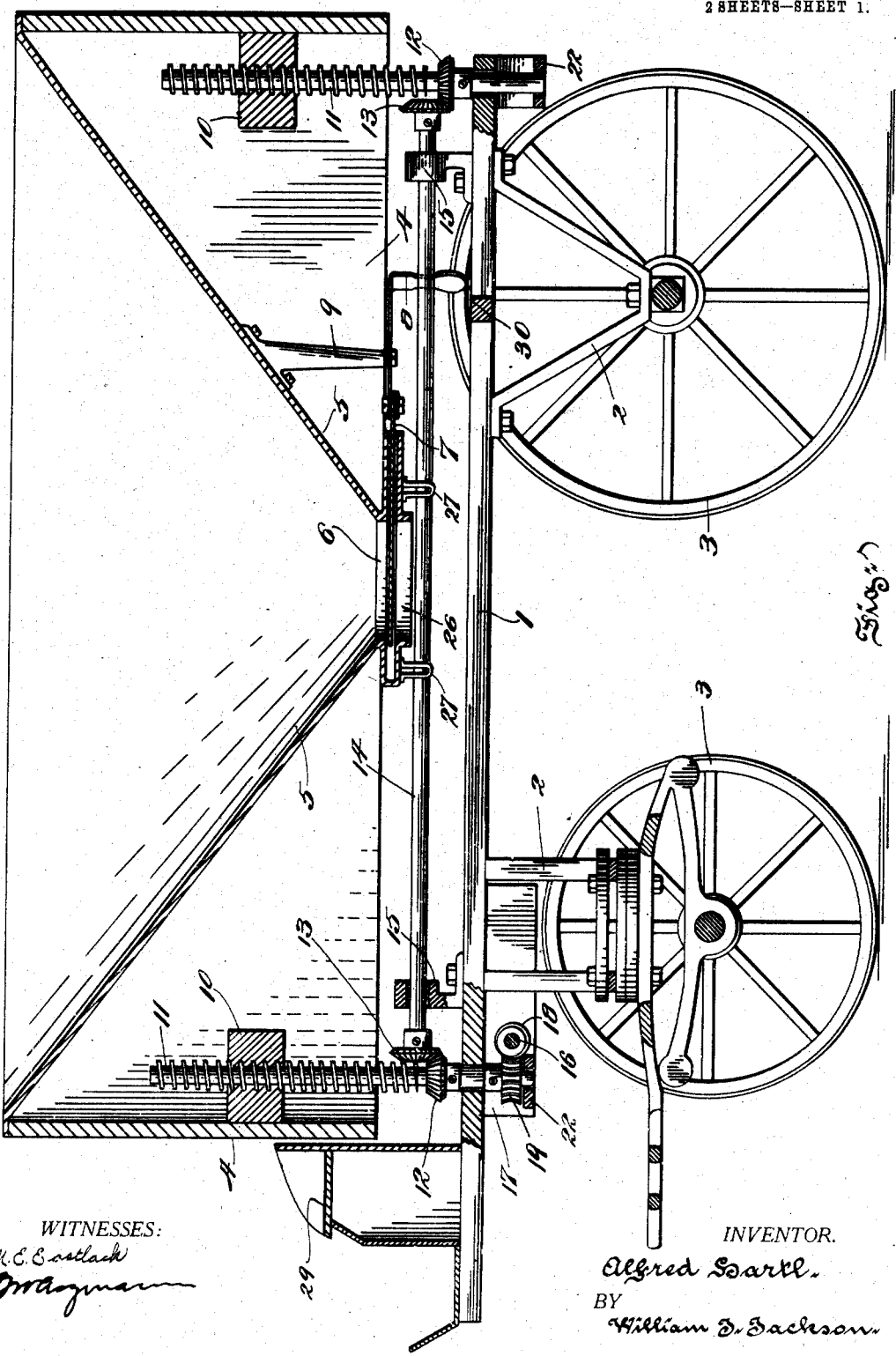
WITNESSES:
INVENTOR.
Alfred Hartl.
BY
William B. Jackson.
ATTORNEY.

A. HARTL.
CHUTE CART OR WAGON.
APPLICATION FILED APR. 28, 1908.
926,983.
Patented July 6, 1909.
2 SHEETS—SHEET 2.
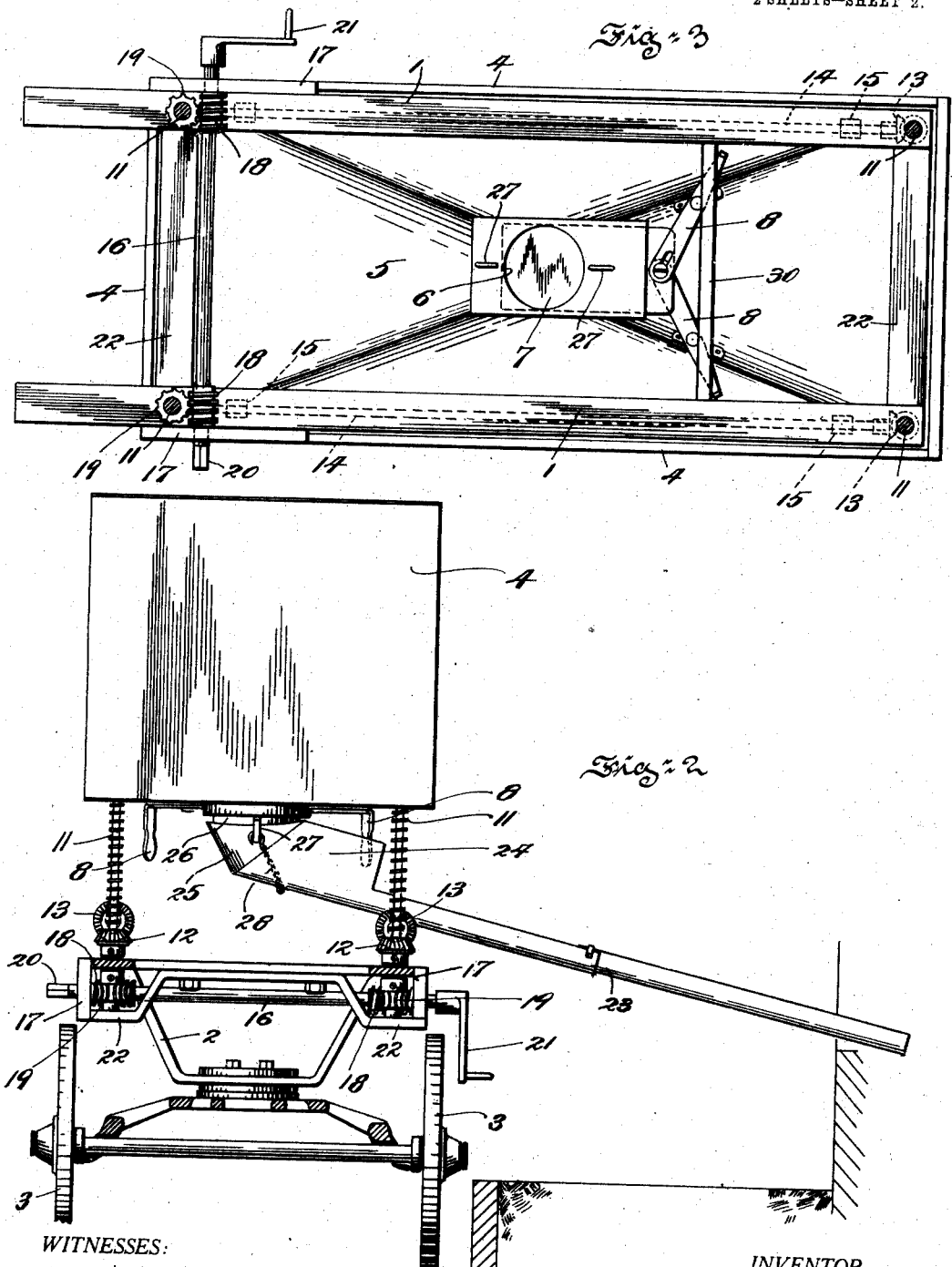
WITNESSES:
INVENTOR.
Alfred Hartl
BY
William J. Jackson
ATTORNEY.

UNITED STATES PATENT OFFICE.

ALFRED HARTL, OF PHILADELPHIA, PENNSYLVANIA.

CHUTE CART OR WAGON.

No. 926,983.  Specification of Letters Patent.  Patented July 6, 1909.

Application filed April 28, 1908. Serial No. 429,717.

*To all whom it may concern:*

Be it known that I, ALFRED HARTL, a citizen of the United States, residing at Philadelphia, in the county of Philadelphia and State of Pennsylvania, have invented certain new and useful Improvements in Chute Carts or Wagons, of which the following is a specification.

This invention relates to chute carts or wagons such as are employed in the delivery of coal to consumers, and has for its principal object the more convenient unloading of such vehicles with less obstruction to the highway.

A further object of the invention is to facilitate and at the same time expedite the discharge of the load by means of simple and efficient mechanism carried by the frame of the wagon and operatively connected with each of the four corners of the wagon body.
A still further object of the invention is to provide a vertically movable body provided with a hopper-like bottom having a central discharge gate, the said body being so arranged and constructed that it may be vertically elevated in a horizontal position.

Other objects of the invention will appear hereinafter.

The invention consists of the improvements hereinafter described and finally claimed.

The nature, characteristic features and scope of the invention will be more fully understood from the following description taken in connection with the accompanying drawings forming part hereof and in which:

Figure 1, is a central, longitudinal, sectional view of a wagon embodying the invention. Fig. 2, is a view in front elevation partly sectioned illustrating the mode of discharging coal from the wagon, and Fig. 3, is a view of the under side of the wagon with the running-gears removed.

In carrying out the invention as here embodied and referring to the drawings there is shown a horizontal frame 1, shown as being mounted upon supports 2, carried by the wheels 3, of the wagon. Vertically movable with respect to the frame 1, is the wagon body 4, shown as being a generally rectangular hollow member provided with a hopper shaped bottom 5, having a discharge opening 6. Normally closing this discharge opening 6, is a gate 7, shown as being horizontally arranged beneath the structure 5, and being susceptible of operation from either side of the wagon by means of pivotally arranged levers 8. These levers have pivotal relation with arms 9, depending from structure 5. To expedite the discharge of the load through said centrally arranged discharge opening 6, use is made of suitable lifting mechanism operatively connected with the four corners of the wagon body 4, whereby the said body and its complemental hopper-like bottom may be elevated and lowered in a horizontal position from and to the frame 1, and a description thereof will now be given.

Arranged at each of the four corners of the body 4, are fixed nuts 10, (see Fig. 1,) through which pass screw-rods 11, supported by and rotatable with respect to the frame 1. Each of these screw-rods of which there are four is provided with a beveled gear 12, having fixed relation with respect to said screw-rods. Meshing with these beveled gears 12, upon each side of the wagon are other beveled gears 13, carried by a longitudinally arranged shaft 14, supported in bearings 15, carried by the frame 1. Arranged transversely of the wagon and in the present instance at or near the front thereof is a horizontally arranged shaft 16, suitably journaled in brackets 17, secured to the frame 1. This shaft 16, is provided with a pair of worm gears 18, meshing with gears 19, fixed to the lower ends of the screw-rods 11. The ends of the shaft 16, are shown as being extended beyond the sides of the wagon line and as being squared at 20, for the reception of a hand-crank 21. The lower portions of the screw-rods 11, are shown as being journaled in members 22. The wagon above described is equipped with a chute 23, having a hood 24, and an elbow union 25. In practice the elbow union 25, is passed over the depending portion 26, of the discharge opening 6, and the chute secured to the links 27, by means of a chain 28, carried by the chute. If desired the frame 1, may be extended beyond the body 4, at its front and provided with a seat 29, so that the body 4, may be moved vertically without interfering with the driver's seat.

From the foregoing description it will be obvious that to discharge a load from the above described wagon, the same may be left standing parallel with the line of travel of the thoroughfare and discharge coal through a chute arranged at right angles to the wagon, it of course being understood that in order to apply the chute, it is first necessary to attach the hand-crank 21, and rotate the shaft 16, together with its gears 18, and thus cause the screw-rods 11, to operate through the nuts 10, and thus lift the body 4, in a horizontal position until a desired height is reached when the discharge gate 7, may be opened by virtue of one of the pivotally arranged levers 8, it being understood that the bar 30, otherwise prevents such opening.

What I claim is:

1. A wagon of the class described comprising a vertically movable body having a hopper-shaped bottom provided with a central discharge gate, means for opening and closing said gate, elevating devices at each corner of and located within said body, mechanism operatively connected with the respective devices for elevating the body and means for preventing the opening of said gate when the body is in lowered position.

2. In a wagon of the class described the combination of a generally rectangular frame comprising a wagon body, a generally hopper-like bottom extending from the top of the frame downward to a central discharge opening there being a clear space left between the body and the hopper-like bottom from the top to the bottom of said frame, elevating devices at each corner of the wagon body and within said space and mechanism operatively connecting the respective devices for elevating the wagon body.

3. In a wagon of the class described the combination of a vertically movable and generally rectangular frame comprising a wagon body, a generally hopper-like bottom extending from the top of the frame downward to a central discharge opening said bottom being contained entirely within and hidden by said frame there being a clear space from top to bottom between the body and hopper-like bottom elevating devices at each corner of the wagon body and within said space, mechanism for operating said devices, a horizontally arranged discharge gate for said opening and a pair of horizontally arranged levers pivotally carried by the hopper-like bottom for operating the gate from the wagon sides, when the wagon body is in elevated position.

4. In a wagon of the class described the combination of a generally rectangular frame comprising a wagon body, a generally hopper-like bottom extending from the top of the frame downward to a central discharge opening there being a clear space left between the body and the hopper-like bottom from the top to the bottom of said frame, fixed nuts at each corner of the wagon body and within said space, screw-rods arranged at the front and rear of said body and rotatably accommodated by said nuts, beveled gears fixed to the front and rear screw-rods and worm gears fixed to one pair of said screw-rods, a pair of horizontally arranged shafts carrying beveled gears extended lengthwise of the wagon and operatively connecting each pair of screw-rods, a horizontally arranged shaft carrying worms extended crosswise of the wagon and operatively connecting one pair of screw-rods and means for operating the last mentioned shaft.

5. In a wagon of the class described the combination of a generally rectangular frame comprising a wagon body, a generally hopper-like bottom extending from the top of the frame downward to a central discharge opening said bottom being contained entirely within and hidden by said frame there being a clear space from top to bottom between the body and the hopper-like bottom, a horizontally arranged discharge gate for said opening, arms depending from said bottom within said space and pivotally arranged levers carried by said arms and operatively connected with said discharge gate.

In testimony whereof I have hereunto affixed my signature in the presence of two subscribing witnesses.

ALFRED HARTL.

Witnesses:
WM. J. JACKSON,
M. E. EASTLACK.